United States Patent
Fayfield et al.

(10) Patent No.: US 9,466,213 B2
(45) Date of Patent: Oct. 11, 2016

(54) APPARATUS AND METHOD FOR POWER MANAGEMENT OF A SYSTEM OF INDICATOR LIGHT DEVICES

(71) Applicant: Banner Engineering Corp., Minneapolis, MN (US)

(72) Inventors: Robert T. Fayfield, Orono, MN (US); Roman York Marjamaa, Minnetrista, MN (US)

(73) Assignee: Banner Engineering Corp., Minneapolis, MN (US)

( * ) Notice: Subject to any disclaimer, the term of this patent is extended or adjusted under 35 U.S.C. 154(b) by 0 days.

(21) Appl. No.: 15/013,869

(22) Filed: Feb. 2, 2016

(65) Prior Publication Data

US 2016/0148509 A1 May 26, 2016

Related U.S. Application Data

(63) Continuation of application No. 13/100,230, filed on May 3, 2011, now Pat. No. 9,286,804.

(51) Int. Cl.
*G08G 1/14* (2006.01)
*G06F 1/32* (2006.01)

(52) U.S. Cl.
CPC .............. *G08G 1/142* (2013.01); *G06F 1/3206* (2013.01); *G08G 1/146* (2013.01)

(58) Field of Classification Search
CPC .............................. G06F 1/3206; G08G 1/142
USPC ................................................ 340/8.1, 932.2
See application file for complete search history.

(56) References Cited

U.S. PATENT DOCUMENTS

| | | | | |
|---|---|---|---|---|
| 4,043,117 A | * | 8/1977 | Maresca | G07F 17/246 368/6 |
| 4,132,983 A | * | 1/1979 | Shapiro | G08B 5/38 340/331 |
| 5,126,732 A | * | 6/1992 | Mardon | G07F 17/12 340/5.33 |
| 5,252,969 A | * | 10/1993 | Kishi | G08G 1/0955 340/3.2 |
| 5,432,508 A | * | 7/1995 | Jackson | E04H 6/42 340/932.2 |

(Continued)

*Primary Examiner* — Naomi Small
(74) *Attorney, Agent, or Firm* — Craige Thompson; Thompson Patent Law

(57) ABSTRACT

Indicator light devices are useful in many applications for indicating properties of physical spaces respectively associated therewith and in physical proximity thereto. The indicator light devices are network-enabled and self-powered, and capable of participating in coordinated power-managed operation to provide a sufficient service life and lower installation and replacement costs. The indicator light devices may be used with or without associated sensors. The various embodiments described herein use various power management techniques singly or in combination to greatly increase the service life of self-power indicator light devices without diminishing their effectiveness in the application. These techniques include operating only the indicator light devices associated with the physical spaces having properties of interest, operating the indicator light devices with synchronized flashing, operating the indicator light devices in accordance with the detection of specific conditions, relevant time operation, in-vicinity activation, and ambient light responsiveness.

21 Claims, 10 Drawing Sheets

(56) References Cited

U.S. PATENT DOCUMENTS

| | | | | |
|---|---|---|---|---|
| 5,659,287 A * | 8/1997 | Donati | G08B 7/06 | 315/292 |
| 6,243,001 B1 * | 6/2001 | Kodaka | G08B 1/08 | 315/241 S |
| 6,292,110 B1 * | 9/2001 | Budnovitch | G08G 1/14 | 340/932.2 |
| 6,507,278 B1 * | 1/2003 | Brunetti | B64F 1/366 | 340/5.3 |
| 6,771,185 B1 * | 8/2004 | Yoo | G06Q 30/0284 | 340/525 |
| 7,295,119 B2 * | 11/2007 | Rappaport | G06F 17/509 | 340/5.8 |
| 7,649,472 B1 * | 1/2010 | Paterno | F21V 33/0076 | 307/116 |
| 7,688,225 B1 * | 3/2010 | Haynes | G08G 1/14 | 340/932.2 |
| 8,098,135 B2 * | 1/2012 | Powell | G06K 7/0008 | 340/10.2 |
| 8,492,983 B1 * | 7/2013 | Berg | H05B 33/0842 | 315/185 R |
| 2002/0163444 A1 * | 11/2002 | Budnovitch | G08G 1/14 | 340/932.2 |
| 2004/0100396 A1 * | 5/2004 | Antico | B63B 51/00 | 340/985 |
| 2005/0096974 A1 * | 5/2005 | Chagoly | G08G 1/14 | 705/13 |
| 2005/0211775 A1 * | 9/2005 | Vaseloff | G06Q 10/087 | 235/385 |
| 2006/0038506 A1 * | 2/2006 | Rose | H05B 33/0818 | 315/247 |
| 2006/0059037 A1 * | 3/2006 | Ivey | G07B 15/00 | 705/13 |
| 2007/0080240 A1 * | 4/2007 | Schuetz | A61C 3/025 | 239/310 |
| 2008/0036574 A1 * | 2/2008 | Andersen | H04B 17/23 | 340/326 |
| 2008/0238649 A1 * | 10/2008 | Arszman | B60Q 1/503 | 340/471 |
| 2008/0266138 A1 * | 10/2008 | Ponert | G08G 1/04 | 340/932.2 |
| 2008/0290598 A1 * | 11/2008 | Weiss | A63H 17/00 | 273/236 |
| 2009/0046451 A1 * | 2/2009 | Hoover | E01F 13/044 | 362/183 |
| 2009/0243860 A1 * | 10/2009 | Springs | G08B 13/196 | 340/573.1 |
| 2009/0322539 A1 * | 12/2009 | Jeng | H05B 37/0227 | 340/573.1 |
| 2010/0141153 A1 * | 6/2010 | Recker | H05B 33/0803 | 315/149 |
| 2010/0201267 A1 * | 8/2010 | Bourquin | H05B 37/0245 | 315/32 |
| 2010/0201309 A1 * | 8/2010 | Meek | B60L 11/1816 | 320/108 |
| 2011/0050442 A1 * | 3/2011 | Hefferon | G08B 5/221 | 340/679 |
| 2011/0133649 A1 * | 6/2011 | Kreiner | H05B 33/0842 | 315/86 |
| 2011/0136536 A1 * | 6/2011 | Garudadri | G01D 21/00 | 455/550.1 |
| 2011/0148850 A1 * | 6/2011 | Kadota | G09G 3/3685 | 345/213 |
| 2011/0221350 A1 * | 9/2011 | Staab | H05B 37/0218 | 315/154 |
| 2012/0092190 A1 * | 4/2012 | Stefik | G06Q 10/02 | 340/932.2 |

* cited by examiner

APPARATUS AND METHOD FOR POWER MANAGEMENT OF A SYSTEM OF INDICATOR LIGHT DEVICES

CROSS-REFERENCE TO RELATED APPLICATIONS

This application claims priority to, and is a continuation of U.S. patent application Ser. No. 13/100,230, entitled "Apparatus and Method for Power Management of a System of Indicator Light Devices," filed May 03, 2011 by Robert T. Fayfield, et al., the entire disclosure of which is incorporated herein by reference.

BACKGROUND OF THE INVENTION

1. Field of the Invention

The present invention relates to indicator light devices, and more particularly to power management of a system of indicator light devices.

2. Description of Related Art

Indicator lights are used in a variety of different types of systems for indicating a condition existing in a physical space associated with and in physical proximity to the indicator light. Indicator lights are commonly employed, for example, in smart parking systems. Smart parking systems have become popular in Asia, Europe and most recently in the United States. These systems are typically used in enclosed parking structures such as parking ramps to maximize parking utilization and increase revenue for the operator (a ramp operator, for example), and to improve the user's (a retail customer, for example) experience. One type of smart parking system uses a vehicle sensor and an indicator, typically an LED light, in proximity to each parking spot to direct customers to specific available parking spaces. A continuous green light typically indicates "available" while a continuous red light typically indicates "occupied." An example of such a smart parking system which uses a wireless network is disclosed in US Patent Application Publication No. 2007/0050240 published Mar. 1, 2007 in the name of Belani et al.

Other examples of systems that employ indicator lights are the pick systems and the pick-put systems common in warehouses and manufacturing facilities. An example of a pick-put system is disclosed in U.S. Pat. No. 6,775,588 issued Aug. 10, 2004 to Peck. In this system, each of the various storage bays in a storage facility include a pick controller and intelligent light assemblies for each location on the bay, and a cart includes a put controller and intelligent light assemblies adjacent to specific receptacles located on the cart. A portable computer on the cart translates warehouse locations to light addresses of locations on a storage bay for indicating to the user (a worker, for example) the need for and quantity of an item to be retrieved from the illuminated location, and communicating instructions to intelligent light assemblies adjacent to specific receptacles located on the cart to indicate to the user the quantity of the retrieved item to be deposited into a particular one of the receptacles on the cart.

BRIEF SUMMARY OF THE INVENTION

For facilities using indicator lights in which the indicator lights and other system components are networked, the cost of installing network cabling can be significant. While wireless components help avoid the cost and disruption of installing network cables throughout a facility, many systems that use indicator lights are still hard-wired to power sources because of power requirements. While many components of a system draw power, the indicator lights typically draw the most power, and the hard-wired connection to a power source is needed to provide sufficient power for a sufficient duration as required in some applications. Unfortunately, having to connect the indicator lights to a power source increases installation cost and limits installation options, and even precludes their use in some facilities. While the indicator lights and other components may be powered by batteries, this alternative is not entirely satisfactory for some applications because the power required by an indicator light can exhaust a battery in an impractically short time. These problems singly or in combination are solved by at least some of the embodiments of the present invention, which may also be applicable to other problems.

One embodiment of the present invention is a method of operating a plurality of indicator light devices physically associated with respective physical locations in a facility and networked over a wireless network for indicating a condition of interest or a plurality of conditions of interest at the physical locations in a manner viewable by a user of the facility. The method comprises identifying a first subset of the physical locations having a first condition of interest, a first subset of the indicator light devices being physically associated with the first subset of physical locations; and operating the first subset of indicator light devices to provide a visual indication of the first subset of physical locations to the user. The operating step comprises synchronously flashing the indicator light devices in the first subset of indicator light devices in accordance with synchronization information conveyed over the wireless network to visually indicate the first subset of physical locations to the user.

Another embodiment of the present invention is a system comprising a wireless network; a plurality of indicator light devices physically associated with respective physical locations in a facility for indicating a condition of interest or a plurality of conditions of interest at the physical locations in a manner viewable by a user of the facility, the indicator light devices being networked over the network; and a synchronization controller networked to the indicator light devices over the network for providing synchronization information to a first subset of the indicator light devices to synchronously flash the first subset of the indicator light devices, the first subset of the indicator light devices being physically associated with a first subset of the physical locations having the condition or conditions of interest to visually indicate the first subset of physical locations to the user.

Another embodiment of the present invention is an indicator light device for use on a wireless network in a facility along with a plurality of networked indicator light devices physically associated with respective physical locations in a facility for indicating a condition of interest or a plurality of conditions of interest at the physical locations in a manner viewable by a user of the facility. The indicator light device comprises a light source for providing the visual indication; a wireless communications node for connecting to the wireless network; a controller for controlling the light source and the wireless communications node; and a computer-readable medium accessible to the controller. The computer-readable medium comprises controller-executable program instructions for identifying a first subset of the physical locations having a first condition of interest, a first subset of the indicator light devices being physically associated with the first subset of physical locations; and providing synchronization information to the first subset of the indicator light devices to synchronously flash the first subset of the indicator light devices and visually indicate the first subset of physical locations to the user.

DETAILED DESCRIPTION OF THE INVENTION, INCLUDING THE BEST MODE

Figure 1:
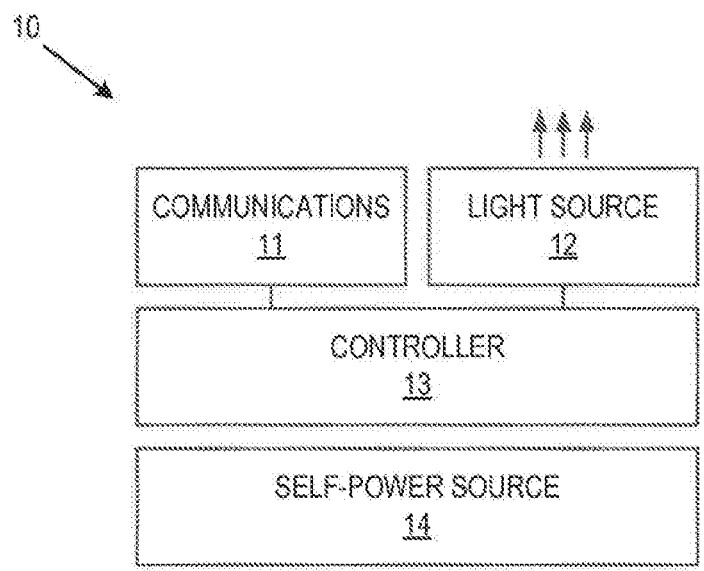
FIG. 1 is a block schematic diagram of an indicator light device.

Indicator light devices are useful in many applications for indicating properties of physical spaces respectively associated with and in physical proximity to the indicator lights. Examples of such applications include parking garages, parking lots, on-street parking, warehouse pick systems and pick-put systems, and so forth. While not precluding wired installations, the indicator light devices described herein are network-enabled and self-powered, and capable of participating in coordinated power-managed operation, so that indicator systems using them may be as effective as wired systems while having a sufficient service life and lower installation and replacement costs. LED-based indicator lights are particularly useful because of their relatively low power requirements and long service life, although any type of light source may be used. Other indicators such as sound sources (horns, voice messages, and the like) may be used along with the indicator light. Coordinated operation of the indicator light devices may be achieved in any desired manner, although the use of wireless networking is particularly effective for minimizing installation and replacement costs. The self-power source may be a power pack using primary (non-rechargeable) batteries, although other self-power sources which may be suitable for some applications include power packs of rechargeable batteries, small fuel cells, super capacitors, solar cells, and other such limited-power sources. The indicator light devices may be used with or without associated sensors, although the use of associated sensors is advantageous in certain applications. Suitable sensors include ultrasonic, photoelectric and video using, for example, pattern recognition. The autonomous power source may be integrated within the same housing as the indicator light device, although it may be contained within a separate housing and locally wired to the indicator light device. One or more sensors suitable for the intended application may be integrated within the same housing as the indicator light device, although such sensors may be contained within a separate housing or housings and locally wired to the indicator light device or wirelessly networked. The networking circuit may be integrated within the same housing as the indicator light device, although it may be contained within a separate housing and locally wired to the indicator light device.

Taking advantage of the networked nature of indicator light devices and particular characteristics of certain applications, the various embodiments described herein use various power management techniques singly or in combination to greatly increase the service life of self-power indicator light devices without diminishing their effectiveness in the application. This makes self-powered indicator light devices practical and cost-effective for many applications. These techniques include operating the indicator light devices with synchronized flashing, specifying conditions of interest from among various possible conditions of the physical spaces and operating only the indicator light devices associated with the physical spaces having the conditions of interest, operating the indicator light devices only during relevant times, operating the indicator light devices based on supply and demand, operating the indicator light devices based on presence of the user, and adjusting respective intensities of the indicator light devices based on ambient light.

An indicator light system may include conventionally-powered indicator light devices along with self-powered indicator light devices. Advantageously, a self-powered indicator light device may include the capability of being powered from a conventional power line, along with the capability of detecting the power source and operating either without power management, or in accordance with some or all of the power management techniques in order to provide a consistent experience to the user.

Devices

FIG. 1 is a simplified block diagram of an illustrative indicator light device 10. The indicator light device 10 includes communications 11 for communicating power management information and other data as desired with other indicator light devices, a gateway, a host, or any combination thereof, either using wired or wireless communications or both via any desired type of network, including, for example, active network architectures, client-server network architectures, wireless ad hoc network architectures, and peer-to-peer network architectures. The indicator light device 10 also includes a light source 12 for providing a visual indication. Suitable light sources include unitary light emitting devices as well as sources formed from arrays or other arrangements of light emitting elements. The power management functions and operation of the light source 12 are controlled by a controller 13. Many different types of devices and circuits may be used as the controller 13, including programmable controllers and microprocessor-memory subsystems which use executable program code, logic circuits, state machines, and any combination thereof. Where memory is used, many different types of memory devices and circuits may be used, including volatile, non-volatile, and combinations thereof. Power for the various elements of the indicator light device 10 is provided by self-power source 14. The entire device 10 may be contained within one housing for maximum ease in installation. Alternatively, the device 10 may be implemented as interconnected modules for flexibility and installation ease; for example, the self-power source 14 may be implemented as a power module, the light source 12 may be implemented as an indicator module, and the controller 13 and communications 11 may be implemented as a communications module, so that an installer may select a desired type of indicator module and a desired type or capacity of self-power source module for assembly into a single unit. Alternatively, the device 10 may be implemented as separate units; for example, the self-power source 14 may be implemented as a power unit in one housing, and the communications 11, the light source 12, and the controller 13 may be implemented as an indicator unit in another housing so that an installer may mount the indicator unit in one location and the self-power source unit in another and perhaps less noticeable location separated from but near the indicator unit. The self-power source unit may supply power to the indicator unit in any desired manner, including by wire and inductively. Alternatively, the self-power source 14 may be implemented as a power unit in one housing, the light source 12 may be implemented as an indicator unit in one housing, and communications 11 may be implemented as a communications unit in one housing, with the controller 13 being placed in any of the units as desired. Alternatively, each unit may be provided with its own power source. The device 10 may be implemented in other permutations as well.

Figure 2:
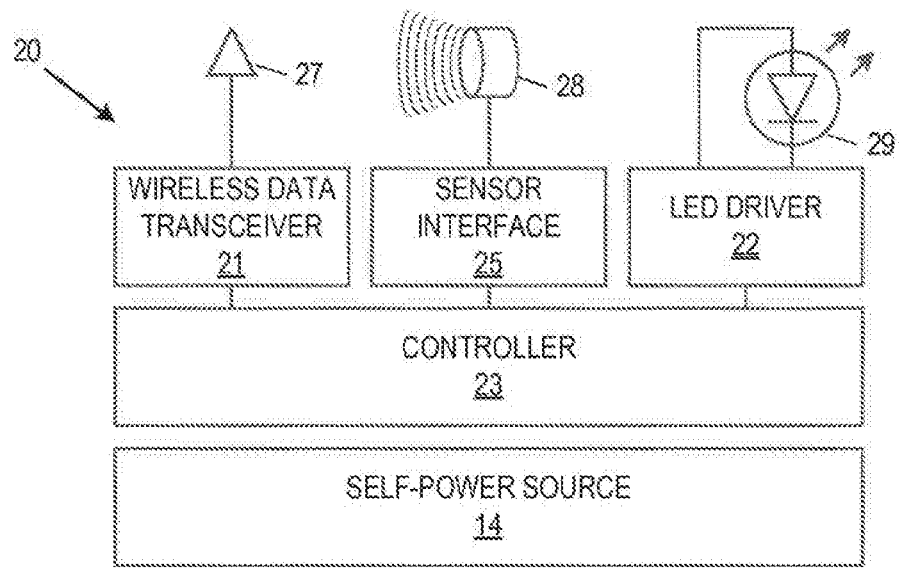
FIG. 2 is a block schematic diagram of an indicator light sensor device.

FIG. 2 is a simplified block diagram of a particular implementation of the indicator light device of FIG. 1, which includes a wireless data transceiver 21 and associated antenna 27 for wireless communications, a light emitting diode ("LED") 29 and LED driver 22 as a light source, and a sensor interface 25 and a sensor 28, illustratively an ultrasonic sensor of a type that is particularly useful in smart parking systems for sensing the presence or absence of a parked vehicle. The term light emitting diode includes devices having one LED element as well as devices having many arrayed or otherwise arranged LED elements. The controller 23 is similar to the controller 13 of the indicator light device 10 (FIG. 1) but is modified also to operate the sensor 28. The entire device 20 may be contained within one housing, or implemented as interconnected modules or as individual units or in any combination thereof. Illustratively, the sensor interface 25 and sensor 28 may be implemented as a sensor module and interconnected with another module or other modules to form the device 20. Illustratively, the sensor interface 25 and sensor 28 may be implemented as a sensor unit in its own housing, the LED 29 and LED driver 22 may be implemented as an indicator unit in its own housing, the wireless data transceiver 21 and associated antenna 27 may be implemented as a communications unit in its own housing, and the self-power source 14 may be implemented as a power unit in one housing, with the controller 23 being in any of the units or even being in its own housing. If desired, each unit may be provided with its own self-power source. For applications in which the sensor must be located in a location that is not readily visible, the light emitting diode ("LED") 29 and LED driver 22, the wireless data transceiver 21 and associated antenna 27, the controller 23, and the self-power source 14 may be implemented in a main unit, and sensor 28 and sensor interface 25 may be implemented in a sensor unit. The device 20 may be implemented in other permutations as well, including, for example, separate indicator and sensor units provided with their own power and communications for combining placement flexibility with installation ease.

Figure 3:
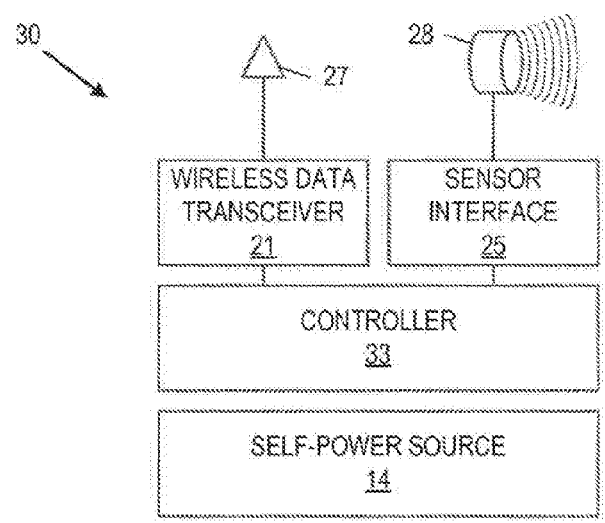
FIG. 3 is a block schematic diagram of a sensor device.

An example of a wirelessly networked sensor device 30 is shown in FIG. 3. The sensor device 30 is similar to the indicator light device 20 (FIG. 2), except that it lacks an indicator light. The controller 33 is similar to the controller 23 except that it need not be capable of controlling an indicator light source.

Some of the many permutations for implementing an indicator light device are shown in FIG. 4 through FIG. 14. In these figures, "I" represents indicator light, "S" represents sensor, "C" represents communications, and "P" represents a self-power source. A network node is shown for external communications, wherein the network may be, for example, a wired network such as Ethernet, a wireless network such as Wi-Fi, or a proprietary wireless network. A proprietary wireless network that emphasizes power efficiency using such techniques as reducing packet size and time synchronization to minimize time on-air is particularly advantageous. However, any desired technology may be used for external communications, including local area networks, wide area networks, personal area networks such as Bluetooth, peer-to-peer wireless communications, and dedicated control and data line wired communications. An indicator light device may include any one or more of these technologies. Controllers are not shown in these figures since a controller or controllers may be contained in one unit, distributed across multiple units, or replicated in multiple units, either with an indicator light, or sensor, or communications, or self-power source, or any combination thereof, or in its own unit, as desired.

Figure 4:
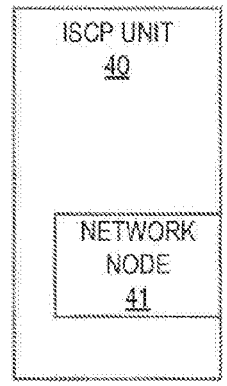
FIG. 4 is a block schematic diagram of an illustrative arrangement of an indicator light, sensor, communications and self-power source for an indicator light device.

FIG. 4 shows ISCP unit 40 in which an indicator light, sensor, communications, and power are integrated into a single unit. Communications is maintained via network node 41.

Figure 5:
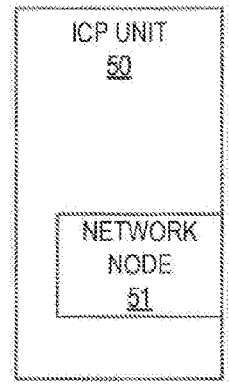
FIG. 5 is a block schematic diagram of an illustrative arrangement of an indicator light, sensor, communications and self-power source for an indicator light device.
Figure 5:
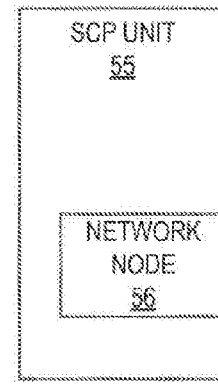

FIG. 5 shows an ICP unit 50 which integrates an indicator light, communications and power, and a SCP unit 55 with integrates a sensor, communications and power. ICP unit 50 includes network node 51, and SCP unit 55 includes network node 56, for communications between the units and to another one or more units, one or more gateways, a host, or any combination thereof on the network.

Figure 6:
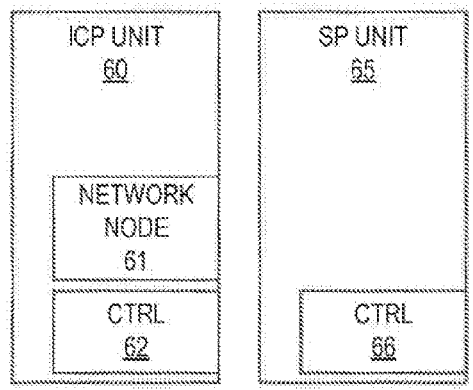
FIG. 6 is a block schematic diagram of an illustrative arrangement of an indicator light, sensor, communications and self-power source for an indicator light device.

FIG. 6 shows an ICP unit 60 which integrates an indicator light, communications and power, and a SP unit 65 which integrates a sensor and power. ICP unit 60 includes network node 61 for communications to another one or more units, one or more gateways, a host, or any combination thereof on the network. Control signals between the ICP unit 60 and the SP unit 65 are handled via respective control ports 62 and 66.

Figure 7:
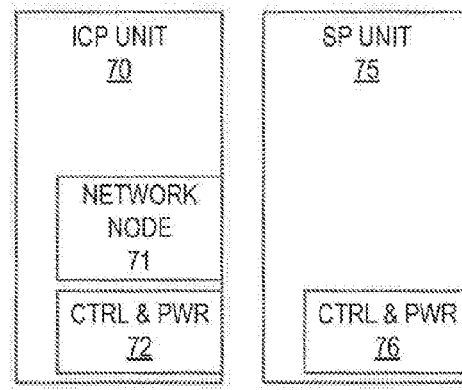
FIG. 7 is a block schematic diagram of an illustrative arrangement of an indicator light, sensor, communications and self-power source for an indicator light device.

FIG. 7 shows an ICP unit 70 which integrates an indicator light, communications and power, and a SP unit 75 which integrates a sensor and power. ICP unit 70 includes network node 71 for communications to another one or more units, one or more gateways, a host, or any combination thereof on the network. Control signals between the ICP unit 70 and the SP unit 75 are handled via respective control and power ports 72 and 76, which may also be used if desired to share power between the units 70 and 75. Power sharing may be done in any desired manner, ranging for example from full-time power sharing by having the self-power sources of the units 70 and 75 wired together, to peak load leveling by selectively interconnecting the self-power sources of the units 70 and 75 when one of the units experiences a peak load (illustratively the unit 70 when the indicator light must operate at maximum intensity as in a bright light situation), to backup when the self-power source in one of the units 70 and 75 is exhausted.

Figure 8:
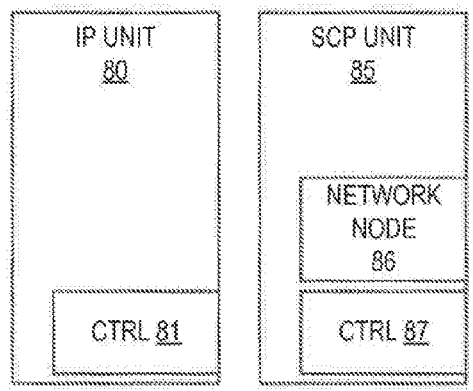
FIG. 8 is a block schematic diagram of an illustrative arrangement of an indicator light, sensor, communications and self-power source for an indicator light device.

FIG. 8 shows an IP unit 80 which integrates an indicator light and power, and a SCP unit 85 which integrates a sensor, communications and power. SCP unit 85 includes network node 86 for communications to another one or more units, one or more gateways, a host, or any combination thereof on the network. Control signals between the IP unit 80 and the SCP unit 85 are handled via respective control ports 81 and 87. If desired, control and power ports may be used instead of control ports 81 and 87, so that power may be shared between the units 80 and 85.

Figure 9:
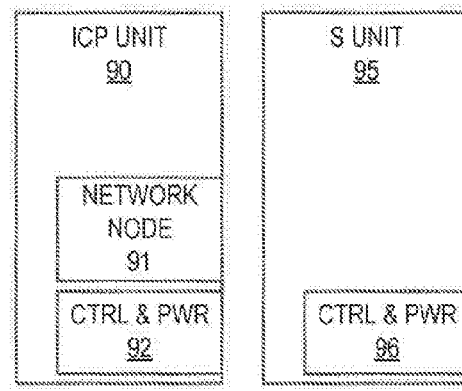
FIG. 9 is a block schematic diagram of an illustrative arrangement of an indicator light, sensor, communications and self-power source for an indicator light device.

FIG. 9 shows an ICP unit 90 which integrates an indicator light, communications and power, and a S unit 95 which only contains a sensor. ICP unit 90 includes network node 91 for communications to another one or more units, one or more gateways, a host, or any combination thereof on the network. Control signals between the ICP unit 80 and the S unit 85 are handled via respective control and power ports 92 and 96, which are also used to provide power from the ICP unit 90 to the S unit 95.

Figure 10:
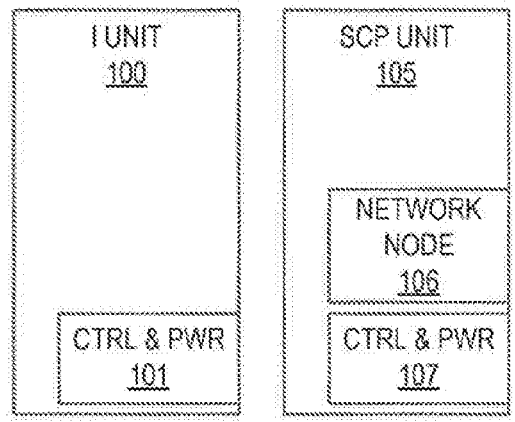
FIG. 10 is a block schematic diagram of an illustrative arrangement of an indicator light, sensor, communications and self-power source for an indicator light device.

FIG. 10 shows an I unit 100 which only contains an indicator light, and SCP unit 105 which integrates a sensor, communications and power. SCP unit 105 includes network node 106 for communications to another one or more units, one or more gateways, a host, or any combination thereof on the network. Control signals between the I unit 100 and the SCP unit 105 are handled via respective control and power ports 101 and 107, which are also used to provide power from the SCP unit 105 to the I unit 100.

Figure 11:
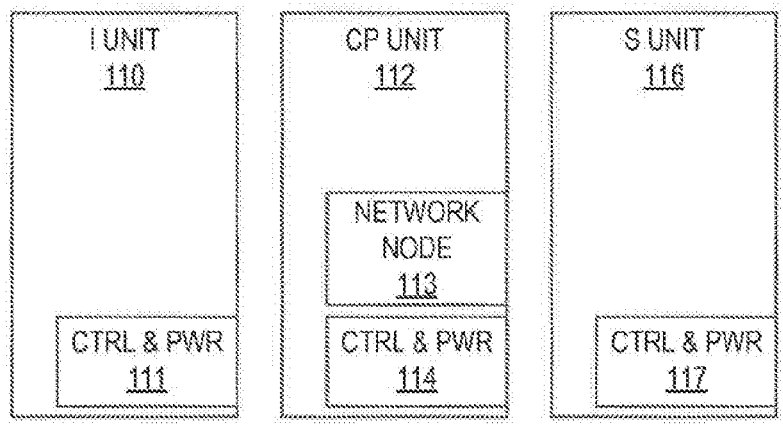
FIG. 11 is a block schematic diagram of an illustrative arrangement of an indicator light, sensor, communications and self-power source for an indicator light device.

FIG. 11 shows an I unit 110 which only contains an indicator light, S unit 116 which only contains a sensor, and CP unit 112 which integrates communications and power. CP unit 112 includes network node 113 for communications to another one or more units, one or more gateways, a host, or any combination thereof on the network. Control signals between the I unit 110, the CP unit 112, and the S unit 116 are handled via respective control and power ports 111, 114 and 117, which are also used to provide power from the CP unit 112 to the I unit 110 and the S unit 116.

Figure 12:
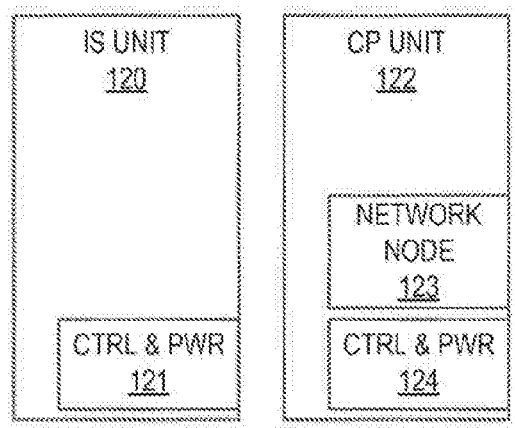
FIG. 12 is a block schematic diagram of an illustrative arrangement of an indicator light, sensor, communications and self-power source for an indicator light device.

FIG. 12 shows an IS unit 120 which integrates an indicator light and sensor, and CP unit 122 which integrates communications and power. CP unit 122 includes network node 123 for communications to another one or more units, one or more gateways, a host, or any combination thereof on the network. Control signals between the IS unit 120 and the CP unit 122 are handled via respective control and power ports 121 and 124, which are also used to provide power from the CP unit 122 to the IS unit 120.

Figure 13:
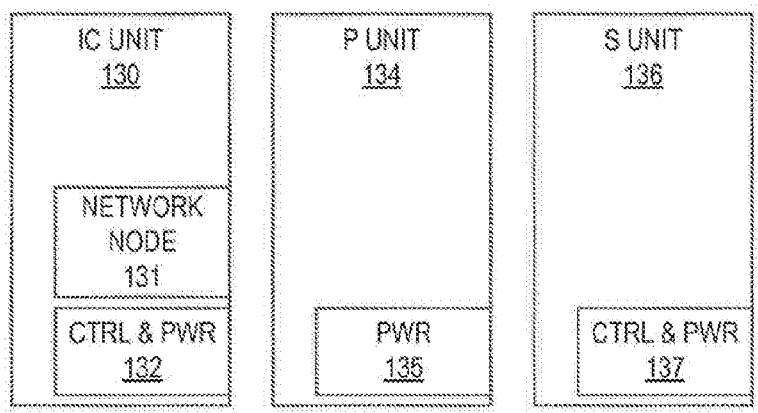
FIG. 13 is a block schematic diagram of an illustrative arrangement of an indicator light, sensor, communications and self-power source for an indicator light device.

FIG. 13 shows an IC unit 130 which integrates an indicator light and communications, an S unit 136 which only contains a sensor, and P unit 134 which only contains power. The IC unit 130 includes network node 131 for communications to another one or more units, one or more gateways, a host, or any combination thereof on the network. Control signals between the IC unit 130 and the S unit 136 are handled via respective control and power ports 132 and 137. Power is provided from the power port 135 of the P unit 134 to the power ports 132 and 137 of the IC unit 130 and the S unit 136 respectively.

Figure 14:
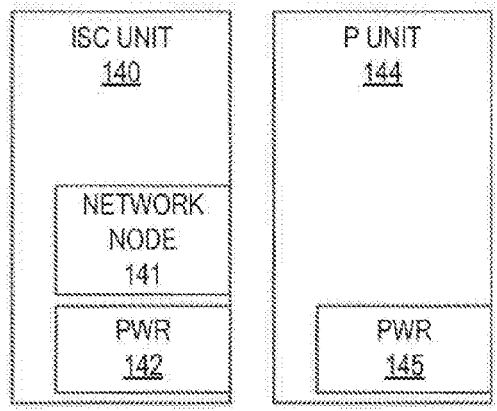
FIG. 14 is a block schematic diagram of an illustrative arrangement of an indicator light, sensor, communications and self-power source for an indicator light device.

FIG. 14 shows an ISC unit 140 which integrates an indicator light, sensor and communications, and P unit 144 which contains only power. ISC unit 140 includes network node 141 for communications to another one or more units, one or more gateways, a host, or any combination thereof on the network. Power is provided by the P unit 144 to the ISC unit 140 via respective power ports 145 and 142.

Figure 15:
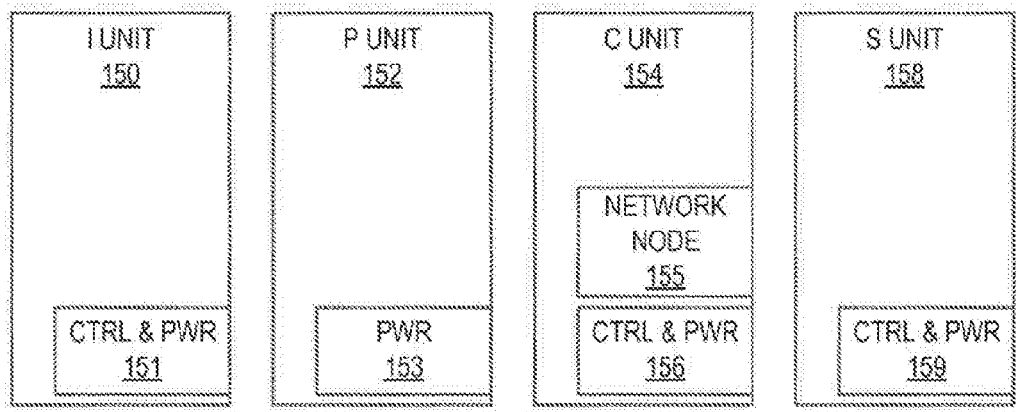
FIG. 15 is a block schematic diagram of an illustrative arrangement of an indicator light, sensor, communications and self-power source for an indicator light device.

FIG. 15 shows an I unit 150 which contains an indicator light, a P unit 152 which contains power, a C unit 154 which contains communications, and a S unit 158 which contains a sensor. The C unit 154 includes network node 155 for communications to another one or more units, one or more gateways, a host, or any combination thereof on the network. Control signals between the I unit 150, the C unit 154, and the S unit 158 are handled via respective control and power ports 151, 156 and 159. Power is provided from the power port 153 of the P unit 152 to the control and power ports 151, 156 and 159.

Figure 16:
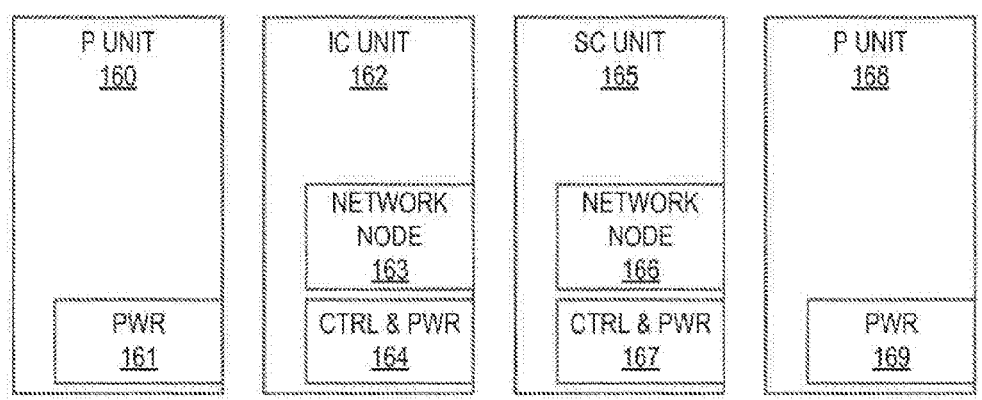
FIG. 16 is a block schematic diagram of an illustrative arrangement of an indicator light, sensor, communications and self-power source for an indicator light device.

FIG. 16 shows an IC unit 162 which contains an indicator light and communications, a P unit 160 which contains power for the IC unit 162, a SC unit 165 which contains a sensor and communications, and a P unit 168 which contains power for the SC unit 165. The IC unit 162 includes network node 163 for communications to another one or more units, one or more gateways, a host, or any combination thereof on the network. The SC unit 165 includes network node 166 for communications to another one or more units, one or more gateways, a host, or any combination thereof on the network. Control signals between the IC unit 162 and the SC unit 165 are handled via respective control and power ports 164 and 167. Power is provided to the IC unit 162 from the power port 161 of the P unit 160 to the control and power port 164. Power is provided to the SC unit 165 from the power port 169 of the P unit 168 to the control and power port 167. If desired, power from the P unit 160 and the P unit 168 may be shared by the IC unit 162 and the SC unit 165 via the control and power port 164 and the control and power port 167.

Networks

The indicator light devices in a system may be interconnected in any desired manner, including dedicated control and data lines and wireless and wired networks. Where networking is used, many suitable network topologies are available, including, for example, bus, star, ring, tree, mesh, and fully connected or hybrid. Suitable network protocols for these and other network topologies are well known in the art. The network may include different types of devices such as, for example, such device types as gateway devices, node devices, host computers, server computers, client devices, master devices, and slave devices in any combination of two or more.

A few examples of suitable network organizations are shown in FIG. 17 through FIG. 20. The connecting lines between the various blocks are intended to show only how the network is organized, and are not intended to show any particular network topology or protocol, or whether the network is wired or wireless. While the networked devices shown are ISCP devices which include an indicator light, sensor, communications and power, these devices may be implemented in any desired manner (for example, as a single unit (modular or unitary) or as multiple units). Moreover, other types of devices may be present on the network, including, for example, ICP devices which have an indicator light but no sensor, and SCP devices with have a sensor but no indicator light. Moreover, the network may also include line-powered devices.

Figure 17:
FIG. 17 is a block schematic diagram of an illustrative network arrangement of indicator light devices.

FIG. 17 shows a simple network in which ISCP devices 171, 172 and 173 are networked to a master 170 and are configured as slave devices. The master 170 alternatively may be a gateway, host, or client, with the ISCP devices 171, 172 and 173 being nodes. The master 170 may be housed separately from the ISCP devices 171, 172 and 173, or may be mounted within one of the ISCP devices 171, 172 and 173. This type of network organization is suitable, for example, for a facility in which all locations are clustered together. It may be desirable for the master 170 to be line-powered in those implementations in which the master 170 is frequently active and provides relatively high power communications.

Figure 18:
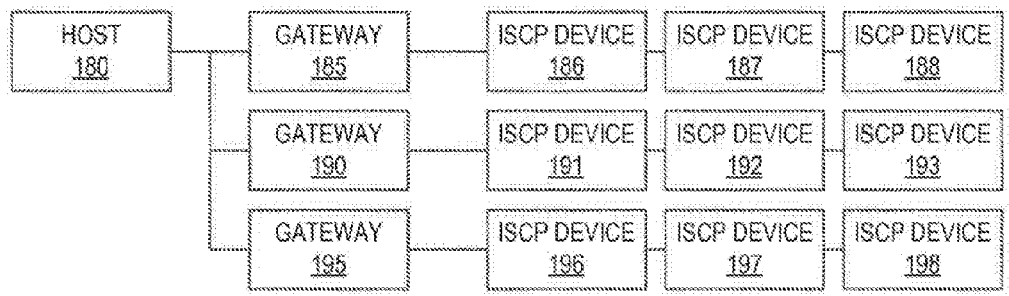
FIG. 18 is a block schematic diagram of an illustrative network arrangement of indicator light devices.

FIG. 18 shows a network in which gateway devices 185, 190 and 195 are networked to a host 180. ISCP devices 186, 187 and 188 are networked to the gateway 185, ISCP devices 191, 192 and 193 are networked to the gateway 190, and ISCP devices 196, 197 and 198 are networked to the gateway 195. This type of network organization is suitable, for example, for a facility in which the locations are clustered into spatially separated areas.

Figure 19:
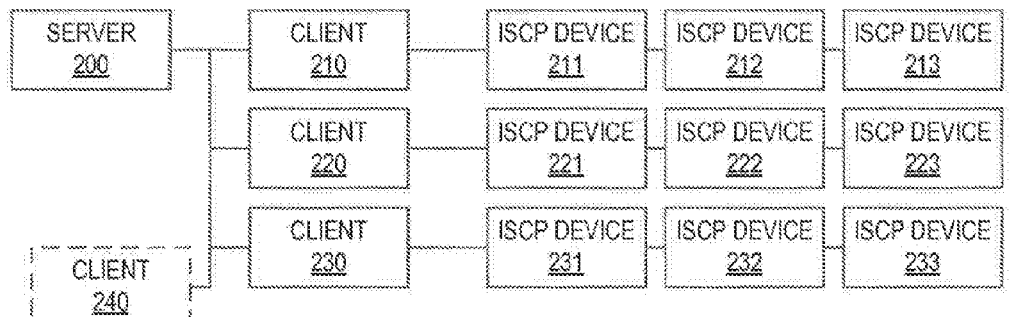
FIG. 19 is a block schematic diagram of an illustrative network arrangement of indicator light devices.

FIG. 19 shows a network in which client devices 210, 220, 230 and optionally 240 are networked to a server 200. ISCP devices 211, 212 and 213 are networked to the client 210, ISCP devices 221, 222 and 223 are networked to the client 220, and ISCP devices 231, 232 and 233 are networked to the client 230. An operator may manage the system from a separate client device 240, illustratively an appropriately configured personal computer. In this case, the clients 210, 220 and 230 may be simple and inexpensive specialized devices for exchanging information between the various networked ISCP devices and the server. Alternatively, any one or more of the clients 210, 220 and 230 may be a more powerful device that is appropriately configured not only to for exchanging information between the various networked ISCP devices and the server, but also to manage the system. This type of network organization is suitable, for example, for a facility in which the locations are clustered into spatially separated areas, and the data processing and storage is done remotely using a client-server model over the internet.

Figure 20:
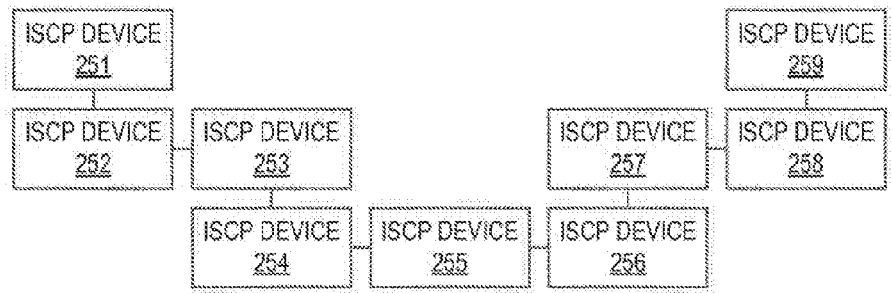
FIG. 20 is a block schematic diagram of an illustrative network arrangement of indicator light devices.

FIG. 20 shows a self-organizing network in which nearest neighbor indicator light devices 251-259 bind with one another. This type of network organization is suitable, for example, for a facility in which all locations are clustered together, and only power management and simple system management functions need to be performed. Network control may be thought of as being distributed among the indicator light devices 251-259.

Power Management

Although an indicator light device such as the device 20 (FIG. 2) may have many power-consuming subsystems, the subsystem having the greatest impact on the service life of the self-power source is the light. Consider the use of four (4) D-cell alkaline batteries as a self-power source. Such a battery pack provides about 20,000 mA hours at 4-6 volts. The ultrasonic sensor 28 and the data transceiver 21 may be duty-cycled so that they require relatively little power over the service life of the self-power source. If a measurement is taken and communicated in ten (10) second intervals, for example, the sensor 28 and data transceiver 21 may be operated so as to draw only about 200 uA, which would allow for about ten years of battery life. On the other hand, light sources consume much more power. Some LED light sources draw about 100 mW or more of current at the battery, and even efficient LED light sources draw about 32 mA at the battery. In an "always on" smart parking system that uses, for example, efficient 32 mA light sources as indicators, the LED light sources are always on with a particular color to direct customers to specific available parking spaces. A green light might indicate "available" while a red light might indicate "occupied," for example. Unfortunately, the useable service life of the battery pack in this 32 mA configuration would be just under one (1) month, which is too short to be practical for a smart parking system application. The usable service life would still be less than adequate even if a more expensive but longer lived lithium battery power source were used, and even if a more efficient light source were used. Moreover, certain applications involve the use of indicator lights in sunny locations, where the indicator lights consume even greater power so as to operate with sufficient brightness.

Such networked indicator lights may be operated in a manner that while different than current approaches, is still entirely satisfactory for the application even while greatly reducing power consumption. Techniques suitable for greatly extending the service life of the power packs in a networked system of indicator lights even while maintaining or enhancing the suitability of the indicator lights for various applications include synchronized flashing, specific condition detection, relevant time operation, supply-demand based operation, presence operation, and ambient light responsiveness.

Figure 21:
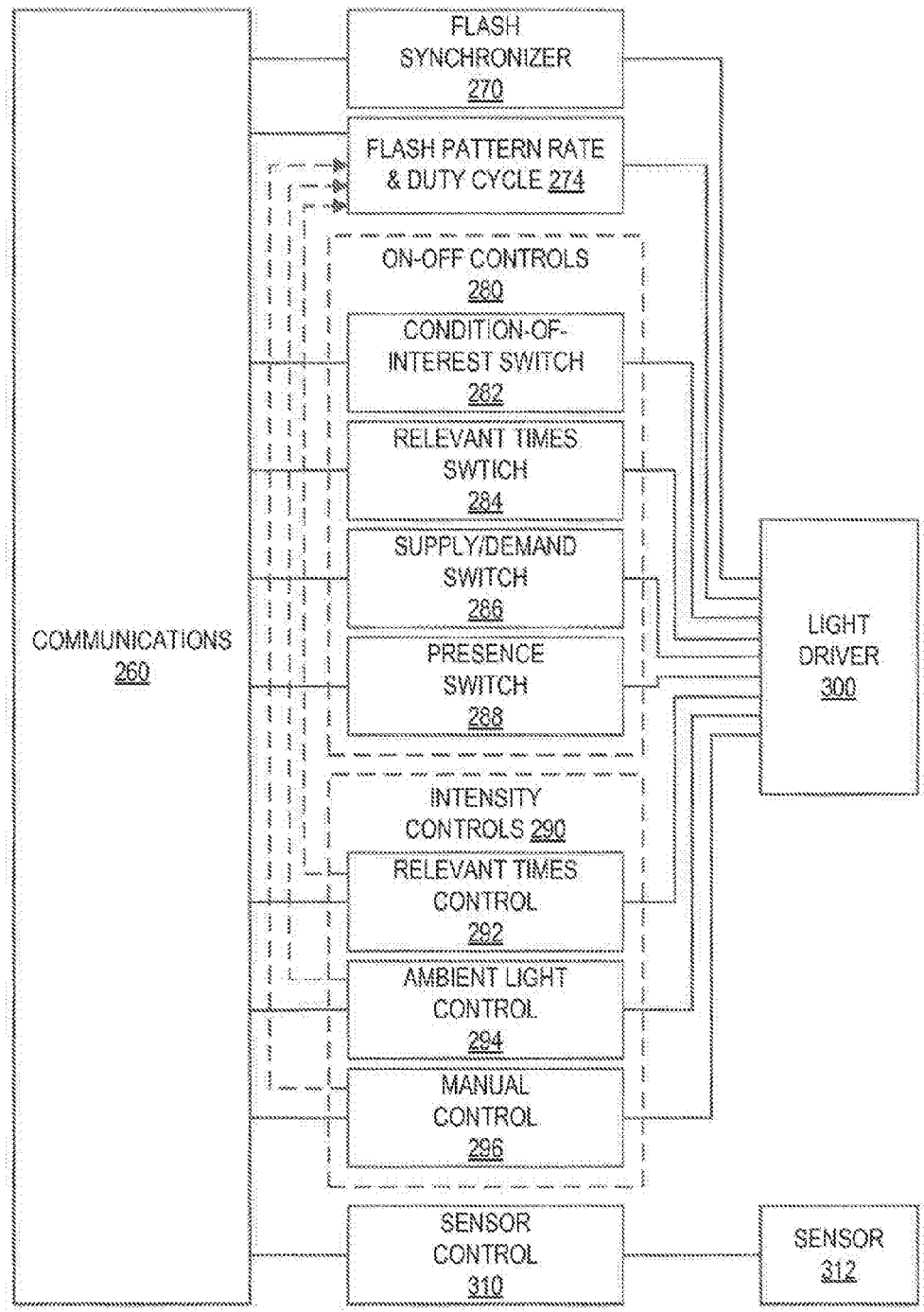
FIG. 21 is a block schematic diagram illustration various illustrative power management functions for a network of indicator light devices.

FIG. 21 is a schematic diagram illustrating various illustrative power management functions that may be carried out to reduce the power requirements of a light source driven by the light driver 300. Flash synchronizer 270 synchronizes the flashes among the indicator light devices within a group, to reduce power consumption while preserving the effectiveness of the indication to the user. A flash pattern, rate and duty cycle controller 274 controls the flash pattern, rate and duty cycle for such purposes as optimizing visibility and intensity for optimal visual effectiveness and power savings. Controls 280 which deactivate the indicator light devices in certain situations to avoid unnecessary power consumption include condition switch 282, relevant times switch 284, supply and demand switch 286, and presence switch 288. Controls 290 which adjust power consumption to optimally balance power consumption and performance include relevant times control 292, ambient light control 294, and manual control 296. Intensity may be controlled in an analog fashion by adjusting the power available to the light driver 300, or digitally by adjusting the flash pattern, flash rate, flash duty cycle (as shown in FIG. 21 by phantom lines to the flash pattern, rate and duty cycle controller 274), or any combination thereof. A sensor 312 is controlled by a sensor control 310. Communications between the controls 270, 282, 284, 286, 288, 292, 294, 296 and 310 and other devices, gateways, hosts, clients and servers in the system are handled by communications 260. These functions and the implementations described herein may be realized in software, firmware or hardware, as desired, and may be provided in the devices themselves, or in the gateways, hosts, clients and servers in the system, or distributed among the devices, gateways, hosts, clients, and servers in the system in any suitable combination. Where functions are realized in software, they may be loaded from or stored in any suitable machine readable medium, including but not limited to solid state memory such as ROM, RAM, SRAM and Flash; magnetic memory, holographic memory, tape, disk, CD ROM, DVD and so forth, whether or not the memory is stand-alone, integrated with a processor core, integrated into a device, available over a network, or otherwise accessible for machine-readability in any way.

Power Management: Flash Pattern, Rate and Duty Cycle Control 274

Current consumption by the light source is greatly reduced by using a low power and efficient light source that is also capable of being flashed to reduce power consumption further, and then flashing it for the indication. A light emitting diode ("LED") is an example of such a light source. By reducing the duty cycle of the LED on-time during indication, the current consumed can be reduced by the ratio of the duty cycle. For example when the system is flashed for 62.5 ms every 1 sec ($\frac{1}{16}$th duty cycle), the average current for the indicator reduces to about 2 mA from its "always on" current of 32 mA. With reference to a 20,000 mA hours alkaline battery pack, for example, the service life of such an indicator light may be increased to just over one year. Greater increases may be realized by using higher capacity power source such as lithium batteries.

The flash pattern, flash rate, flash duty cycle, and/or analog intensity may be established at a fixed value optimal or at least satisfactory for the application, or a default value may be established which may then be varied based on any desired parameter or parameters. An example of the latter is to vary the duty cycle for an indicator light at a particular location based on the time of day as determined by the relevant times control 292, for example, or the amount of ambient light sensed at or near that location as determined by the ambient light control 294, for example, or an observer using manual control 296, for example, or any combination thereof. The flash pattern, flash rate, flash duty cycle, and/or analog intensity may be determined within an indicator light device based on sensor measurements made by the indicator light device and/or based on data and/or commands received from other devices, sensors, gateways, hosts, clients and servers in the system, or may be determined within the system but outside of the indicator light device and communicated to the indicator light device.

Any desired flash pattern readily visible to the human eye may be used, including simple and complex patterns. An "eye catching" flash pattern is particularly suitable. Care should be taken to avoid flash patterns that can aggravate medical conditions such as seizure. As between several equally eye catching patterns, the pattern resulting in the least power consumption is advantageous.

Power Management: Flash Synchronizer 270

The flashing of the indicator lights throughout a particular area or even through an entire facility may be coordinated to provide a readily visible and effective indication to the user without jeopardizing the power reduction benefits of flashing. Coordinated flashing enables the user to readily observe at a single glance the indicated status for various physical locations in the facility within the user's view.

Flash synchronization may be achieved using synchronization information conveyed over a wireless network, where the synchronization information may be a beacon, a time marker, a flash command, a flash sequence command, or any other type of synchronization information. The synchronization information may be provided by a synchronization controller, which may be a stand-alone device, part of a device such as a gateway radio, part of a master device, installed in a node or slave device, or implemented in a computer such as a host, client or server computer. One illustrative technique for flash synchronization is to implement communications with radios that have time-synchronous operation, and to use this common capability to trigger the flashing of the indicator lights in the network at the same instant. Such radios are available from Banner Engineering Corp. of Minneapolis, Minn., USA, and include Sure-Cross™ Wireless I/O Products such as the model DX70 and DX80 nodes and gateways. The model DX80 radio products, for example, accomplish flash synchronization as follows. A DX80 radio system includes a gateway radio and one or more node radios. During run time, the master and slave radios, or gateway and node radios, communicate synchronously using a sequence of one hundred twenty eight (128) individual time-bounded frames that make up a larger "super frame." During operation, the master radio sends one or more beacons at the beginning of one or more frames in the super frame. These beacons are used by the slave radios to establish a common time schedule, so that all radios know exactly when each frame in the super frame will occur and thereby when they can communicate. In addition, the slave radios may use this time schedule to actuate device outputs at precisely defined times, thereby enabling synchronized light flash patterns. In set up mode, for example, the DX80 slave radios may be configured with a "recipe" that indicates during which frame(s) the light output(s) should be actuated during run time operation. The recipe may be encoded in a bank of eight (8) non-volatile memory registers, each containing a sixteen (16) bit word where each bit in the word represents a single frame in the super frame; If for example all radios are configured with a "recipe" to actuate a light output only during frame one (1) of the super frame, the effect will be synchronized flashing of all enabled outputs with a duty cycle of $\frac{1}{128}$. More complicated patterns may be created as desired by configuring a "recipe" that actuates during multiple frames in the super frame.

Another illustrative technique for flash synchronization is firefly synchronization in ad hoc networks. Various types of firefly synchronization are well known in the art; see, for example, Tyrrell, Alexander; Auer, Gunther; and Bettstetter, Christian; Firefly Synchronization in Ad Hoc Networks, 2006.

Power Management: Condition-of-Interest Switch 282

Where the condition being indicated is presence or absence of something, the indicator light device may be illuminated to indicate only the condition of interest. In a smart parking system, for example, the condition-of-interest may be vacant parking spots, or the absence of parked vehicles. In a pick system, for example, the condition-of-interest may be the bins where the desired item is available, or the presence of the desired items. The indicator light devices may be operated to take advantage of the following observation: when trying to find a parking spot or a needed item, a person is only interested in available parking spots or in the bins that contain the needed item. Therefore the indicator system may be operated to save battery power by only indicating the desired condition, since the number of indicator light devices that need to be flashed is often less than all of the indicator light devices in the system. Illustratively, flashing green LED's may be used to indicate the desired condition "Available" (for example, vacant spots or bins containing a needed item), while the green LED's would not be illuminated if the desired condition were absent (for example, for occupied parking spots or bins that are empty or contain items that are not needed).

Additional conditions of interest may be indicated by flashing a different color light. In a parking system context, for example, filled parking spots, or the presence of parked vehicles, may be indicated by flashing red LED's, and vacant handicapped parking spots, or the absence of parked vehicles from handicapped parking spots, may be indicated by flashing blue LED's. If desired, each indicator light device may be provided with colored LED's corresponding to two or more conditions of interest, so that each indicator light device may indicate any of the conditions of interest. Alternatively, two or more indicator lights devices with respective colored LED's for the respective conditions of interest may be located in the same general area to indicate any of the conditions of the conditions of interest. The different colored LED's may be flashed alternatively or together, as desired.

As a condition of interest indicator, red LED's generally have the particular advantage of consuming less power than LED's of equal intensity in other colors because the energy gap of the semiconductor efficiently produces a red electroluminescence. Therefore, red LED's may be used as the only light source in an indicator light device where maximize battery life is desired, or may be used as an additional light source in an indicator light device to indicate an additional condition of interest without unduly impacting battery life.

The reduction in indicator on-time achieved by condition-of-interest sensing varies depending on the application, and may be further enhanced by limiting the use of the technique to times when the condition being sensed is likely to be rare. In smart parking systems, for example, condition-of-interest sensing is particularly effective when used during busy times, since relatively fewer parking spots would be available.

Using both flash and condition-of-interest sensing results in over two years of operation in the case of the alkaline battery pack example. This calculation is based on a conservative estimate of fifty percent reduction in indicator on-time, which would reduce the average current for the indicator to about 1 mA from its "always on" current of 32 mA. Depending on the application and the use of complementary power management techniques to limit condition-of-interest sensing to times when the condition being sensed is likely to be rare, the actual reduction realized may be substantially greater.

Power Management: Relevant Times Switch 284

The indicator system may be operated only during relevant times when indication is likely to be needed. In the case of a smart parking system, for example, parking guidance may not be needed when the facility is not busy, which may be inferred with reasonable confidence based on known "slow" times of the day or hours of closure, or which may be determined by real time occupancy sensing. When these times are factored in, the amount of "on-time" of the light of an indicator light device is quite low, even less that 50%.

In the case of a smart parking system, for example, the indicator light devices and sensors need to be operated only when the parking facility is open for business or when the parking facility is likely to be busy. Many parking facilities, for example, are not open for business for twenty-four hours every day, and may not be busy outside of normal working or shopping hours except during special events. No parking indication is needed during these periods. To take advantage of such situations, the indicator light device may be operated only during times that parking guidance is anticipated to be important. Conservatively assuming twelve hours per day of sensor and indicator operation and continuing the alkaline battery pack example, the average current for the indicator further decreases to about 0.5 mA from its "always on" current of 32 mA. This provides just over four and a half years of service life with the alkaline battery pack. A lithium battery may be used in place of the alkaline battery pack to provide an even longer service life.

One technique for implementing the relevant times switch 284 is to maintain a central operation schedule, and communicate appropriate activate/deactivate commands to the indicator light devices from a host or a scheduler client. Another technique is to enable each indicator light device with a calendar capability, and to preset on/off hours and days in each indicator light device manually during installation, or over a network after installation during a setup procedure. Another technique is to maintain a central operation schedule and upload the schedule after each update to the indicator light devices, which activate and deactivate themselves individually based on the locally stored schedule.

Power Management: Supply/Demand Switch 286

Groups of light indication devices may be selectively activated and deactivated in stages based on supply and demand of the condition-of-interest. In the case of a parking garage servicing a mall, for example, the frequency of use of parking spaces tends to decline with increased distance from the mall entrance. Therefore, during times of light activity, only the group of indicator light devices nearest the mall entrance needs to be activated, while groups of indicator light devices increasingly more distant from the mall entrance may be successively activated as activity increases. In the case of a warehouse pick system, for example, when supply of the desired part is plentiful and available from several locations in the warehouse, only the indicator light device or devices nearest a main aisle or access door needs to be activated, while indicator light devices increasingly more distant from the main aisle or access door may be successively activated as supplies dwindle. The level of activity may be determined by the sensors associated with the active devices, and the groups of indicator light devices may be activated/deactivated based on the number of cars or parts in the facility, or on particular floors or in particular areas of the facility. The supply criteria of parking availability (in the case of parking garage) or inventory (in the case of a warehouse) may be used to determine whether to enable the indicator light device; for example, twenty percent full in a section of the facility or the entire facility. In the case of parking structures, for example, many have some level of area counting, such as a level-by-level granularity or a section-by-section granularity, which may be used as a basis for successive activation/deactivation.

In some facilities, light indication may be needed during times of low activity only for particular locations within the facility. In the case of a parking garage servicing a mall, for example, the parking spaces nearest the mall entrance can be expected to be used even during times of low activity, while the more remote spaces can be expected to be disused during such times of low activity. In this case, either high capacity self-powered indicator light devices or line-powered indicator light devices may be used for those locations which experience frequent activity, while self-powered indicator light devices of lower capacity and hence lesser cost may be used for the other locations in the facility. When activity is low as determined by the sensors monitoring the near spaces, the remote self-powered indicator light devices may be deactivated. When activity is high as determined by the sensors monitoring the near spaces, the self-powered indicator light devices may be activated.

One technique for implementing the supply switch 286 is to evaluate data from the sensors associated with the indicator light devices on a remote device such as a host or client device, and communicate appropriate activate/deactivate commands to groups of indicator light devices as appropriate. Such data is readily available when the sensors are active. However, for sensors associated with inactive indicator light devices, the inactive devices may be powered up periodically, either by polling from a host or client device, or based on an internal schedule, and their results communicated to a host or client for a determination of whether the indicator light devices in the area should remain activated or be deactivated.

Power Management: Presence Switch 288

The sensors used in an indicator system to detect the status of the locations may be supplemented by additional sensors for user presence detection. Supplemental sensors may be used, for example, to detect the presence of a user requiring an indication, so that indicator light devices may remain deactivated unless a user is present. In the case of a smart parking system, for example, indicator light devices and their associated sensors within a particular area may be activated when a vehicle is present in the vicinity. A supplemental sensor such as a wireless magnetometer may be used to detect the general presence of vehicles. When a vehicle is detected, the indicator light devices and their associated sensors in the area are activated. If no further activity is detected by the magnetometer or by the sensors for the area within a period of time, illustratively a fixed amount of time such as sixty seconds, the indicator light devices and their associated sensors in the area may be deactivated. The magnetometer remains active so that if another vehicle is detected by the magnetometer before the time elapses, the time is extended until the algorithm times out. In this way the sensor-indicator devices within an area are operated only when a vehicle is trying to find a spot in that area.

Other suitable types of user presence sensors include photoelectric beams, card readers, video monitors, attendant observation, and so forth.

Power Management: Relevant Times Control 292

The indicator system may be operated at greater or lesser intensity depending on relevant times. Light brightness may be varied based on time of day, for example. In the case of a smart parking system, for example, the indicator light devices may be operated at lesser intensity in early morning or late evening. In parking structures having areas that are shaded during certain times of day, the indicator light devices may be operated at lesser intensity at these times.

One technique for implementing the relevant times control 292 is to maintain a central operation schedule on a host or a scheduler client, and communicate appropriate activate/deactivate commands to the indicator light devices from the host or the scheduler client. Another technique is to enable each indicator light device with an internal date and time clock, and to preset on/off hours and days in each indicator light device manually during installation, or over a network after installation during a setup procedure. Another technique is to maintain a central operation schedule and upload the schedule after each update to the indicator light devices, which activate and deactivate themselves individually based on the locally stored schedule. The intensity of operation may be controlled digitally by adjusting the flash rate and/or duty cycle, or in an analog manner by adjusting the current available to the light source, or by a combination thereof. Operation of the relevant times control 292 and the relevant times switch 286 may be combined if desired.

Power Management: Ambient Light Control 294

An ambient light detector may be used to detect the amount of ambient light about an indicator light device, so that intensity of the light may be adjusted to the lowest amount necessary to operate the light at sufficient intensity for the local ambient conditions. Smart parking systems often are used in parking structures which are generally dark most times of the day so the light currents can be quite low on average. However during sunny times of day, certain spots such as the ends of rows may be more brightly illuminated due to their location within the parking facility. Moreover, even a parking structure may have parking spots exposed to the outside. An ambient light detector may be included in the vicinity of several indicator light devices or with each indicator light device (for example, in the housing of a device which combines the sensor and indicator, or in the housing of the indicator where the sensor and indicator are separately housed) so that based on the amount of light detected at a particular spot, the light intensity may be increased or decreased to provide sufficient illumination for the indication with minimum effective power consumption. The ambient light measurement may be made in the dead time between flashes to avoid being "sprayed" by the LED indicator; this results in a more accurate ambient light measurement.

One technique for implementing the ambient light control 294 is to maintain data on the ambient light conditions and perform the ambient light control calculations centrally, on a host or client, and communicate appropriate flash pattern, rate, duty cycle, and/or current adjustment commands to the indicator light devices. Another technique that is suitable particularly when an indicator light is provided with its own ambient light sensor is for the indicator light device to adjust its own intensity directly, based on the output of the ambient light sensor.

Power Management: Manual Control 296

Manual control of light intensity may be provided if desired. Manual control may be provided to allow full override of all functions or of only selected functions.

Device Implementation Example

Figure 22:
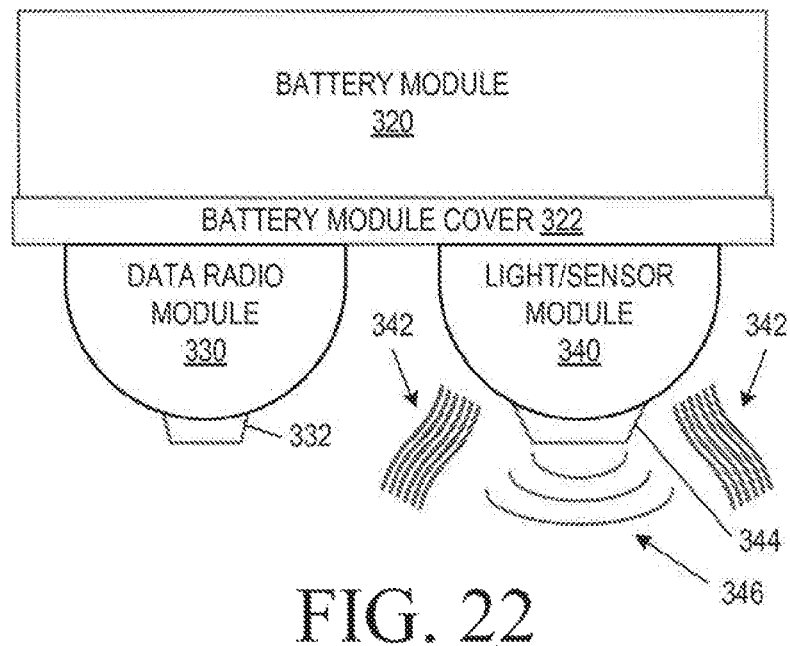
FIG. 22 is a side plan diagram of an illustrative indicator light device.

FIG. 22 is a plan view of an implementation of the wirelessly networked indicator light device 200 of FIG. 2 in the form of a unitary device assembled from interconnected modules. A battery module 320 illustratively containing four (4) D-cell alkaline batteries or lithium batteries serves as the base of the device, and is used to mount the device to any suitable surface from the bottom or side surfaces of the battery module 320. A battery module cover 322 completes the battery module 320. A data radio module 330 and a light and sensor module 340 are mounted to the battery module cover 322 in any suitable manner, illustratively by respective externally threaded conduits which project from the data radio module 330 and the light and sensor module 340 through respective holes in the battery module cover 322 and are secured by respective nuts. The light and sensor module 340 includes an embedded ultrasonic sensor 344 for emitting ultrasonic waves 346 and detecting reflected waves (not shown), and a transparent or translucent semispherical housing section for emitting light 342 of a desired color or colors. The data radio module 330 includes a data transceiver (not shown), an embedded antenna (not shown), and a button 332 which an installer may press to bind the data radio module 330 to a suitable wireless network. Alternatively, the ultrasonic sensor 344 may be used for this purpose by implementing a distance-sensing function. If the ultrasonic sensor detects an object within a small distance of the sensor face for a certain amount of time, such as the installer's hand positioned near the sensor face, the indicator light device then enters into binding mode for a certain amount of time. The size and configuration of the battery module 320, the data radio module 330, and the light and sensor module 340, and the type of interconnection described are illustrative, and a variety of different sizes, configurations and interconnection techniques are suitable.

Figure 23:
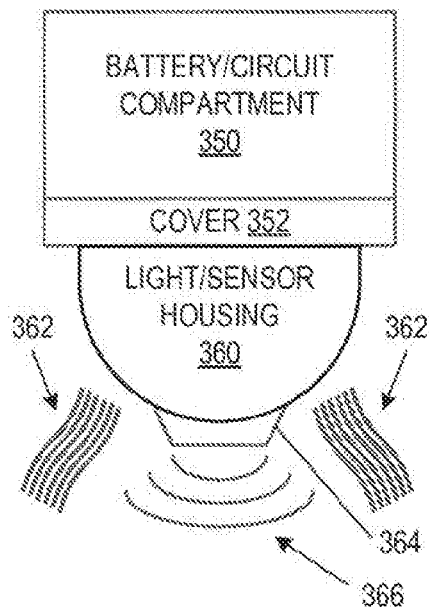
FIG. 23 is a side plan diagram of an illustrative indicator light device.

FIG. 23 is a plan view of an implementation of the wirelessly networked indicator light device 200 of FIG. 2 in the form of a unitary device. A battery and circuit compartment 350 illustratively contains four (4) D-cell alkaline batteries or lithium batteries and the circuit board or boards for the device electronics, including processor, memory, radio and antenna, serves as the base of the device, and is used to mount the device to any suitable surface from the bottom or side surfaces of the battery compartment 350. A compartment cover 352 completes the compartment 350. A light and sensor housing 360 is mounted to the battery module cover 352 in any suitable manner, illustratively by an externally threaded conduit which projects from the light and sensor module 360 and through a hole in the cover 352 and secured by a nut. The light and sensor housing 360 includes an embedded ultrasonic sensor 364 for emitting ultrasonic waves 366 and detecting reflected waves (not shown), and a transparent or translucent semispherical housing section for emitting light 362 of a desired color or colors. A binding button (not shown) may be provided on the side of the compartment 350 or inside the compartment 350, so that an installer may press the button to bind the data radio to a suitable wireless network. Alternatively, the ultrasonic sensor 364 may be used for this purpose by implementing a distance-sensing function. If the ultrasonic sensor detects an object within a small distance of the sensor face for a certain amount of time, such as the installer's hand positioned near the sensor face, the indicator light device then enters into binding mode for a certain amount of time. The size and configuration of the indicator light device shown in FIG. 23 are illustrative, and a variety of different sizes, configurations and interconnection techniques are suitable.

Figure 24:
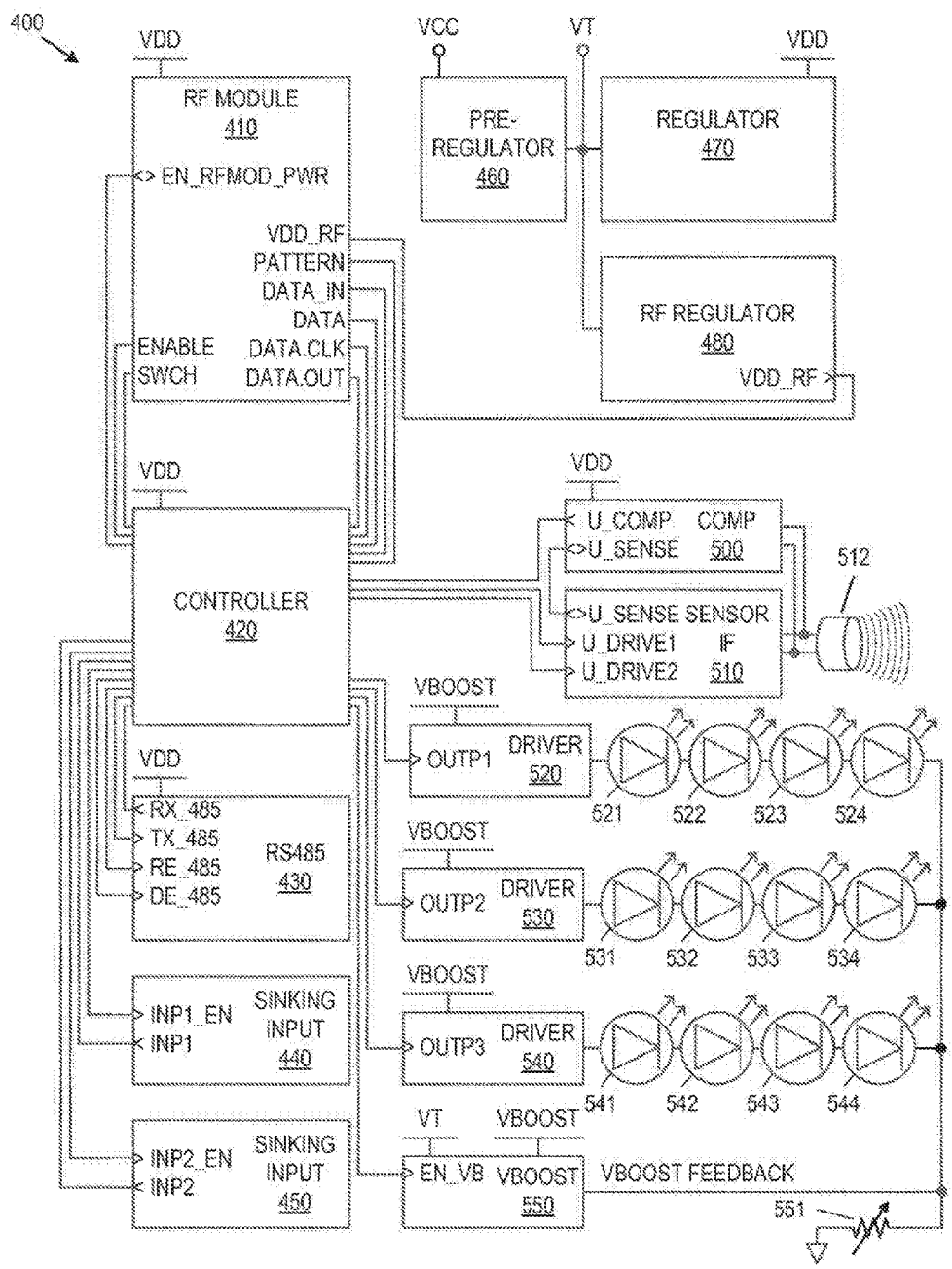
FIG. 24 is a partial block schematic diagram, partial circuit diagram of an illustrative indicator light device.

FIG. 24 is a schematic diagram of a circuit 400 suitable for the wirelessly networked indicator light device implementations shown in FIG. 22 and FIG. 23. The various functions of the circuit 400 are controlled by a suitably programmed programmable controller 420. Wireless networking is handled by RF module 410, in accordance with various signals PATTERN, DATA_IN, DATA, DATA.CLK, DATA.OUT, ENABLE and SWCH between the RF module 410 and the controller 420. Wired networking is handled by RS485 circuit 430, in accordance with various signals RX_485, TX_485, RE_485 and DE_485 between the RS485 circuit 430 and the controller 420. External control signals may be applied through sinking inputs 440 and 450. An ultrasonic transducer 512 is driven by sensor interface 510, with transducer drive being controlled by signals U_DRIVE1 and U_DRIVE2 between the controller 420 and the sensor interface 520. Object proximity is detected by comparator 500, and the detection results are reported by signal U_COMP between the comparator 510 and the controller 420. Light output may be red, green or blue. The pulse rate and duty cycle of red light output from an array of LED elements 521, 522, 523 and 524 is controlled by signals OUTP1 from the controller 420 to driver 520. The pulse rate and duty cycle of green light output from an array of LED elements 531, 532, 533 and 534 is controlled by signals OUTP2 from the controller 420 to driver 530. The pulse rate and duty cycle of blue light output from an array of LED elements 541, 542, 543 and 544 is controlled by signals OUTP3 from the controller 420 to driver 540. and to VBOOST circuit 550 respectively. While pulse width modulation is an efficient way to control pulse intensity, pulse intensity may also be controlled by analogue with electronically adjustable set current resistor 551.

Power to the various components of the circuit 400 is provided by regulator 470, while power to the RF module 410 is provided by RF regulator 480. The power source may be external line power VCC in the range of from twelve to twenty-four volts, which is pre-regulated by pre-regulator 460 before being applied to the regulator 470 and the RF regulator 480, or may be battery power in the range of three to five volts applied to the regulator 470 and the RF regulator 480. The higher voltage VBOOST required for the LED drivers 520, 530 and 540 is generated in the VBOOST circuit 550 using, for example, a switch mode converter.

The battery pack providing VT may be capacitor-backed to maintain a low peak current. Batteries generally, and alkaline batteries in particular, have a higher capacity at lower average current. However, when the LED's are flashed, the current drawn from the battery can approach 100 mA with some less efficient LED's. To avoid this high peak current drain, the batteries may be backed by a sufficiently large capacitive device, or super capacitor, to ensure that the peak current from the battery stays near the average operating current, illustratively less than about 5 mA. This technique further improves battery capacity; at low temperatures this improvement may be considerable.

A variety of indicator lights, sensors, and wireless system components suitable for a variety of applications including smart parking systems generally and pick systems generally are available from Banner Engineering Corp. of Minneapolis, Minn., USA; see, e.g., Products & Applications: Indicator Lights, downloaded from http://www.bannerengineering.com/en-US/product on Sep. 21, 2010.

Application Example: Parking Garage

Figure 25:
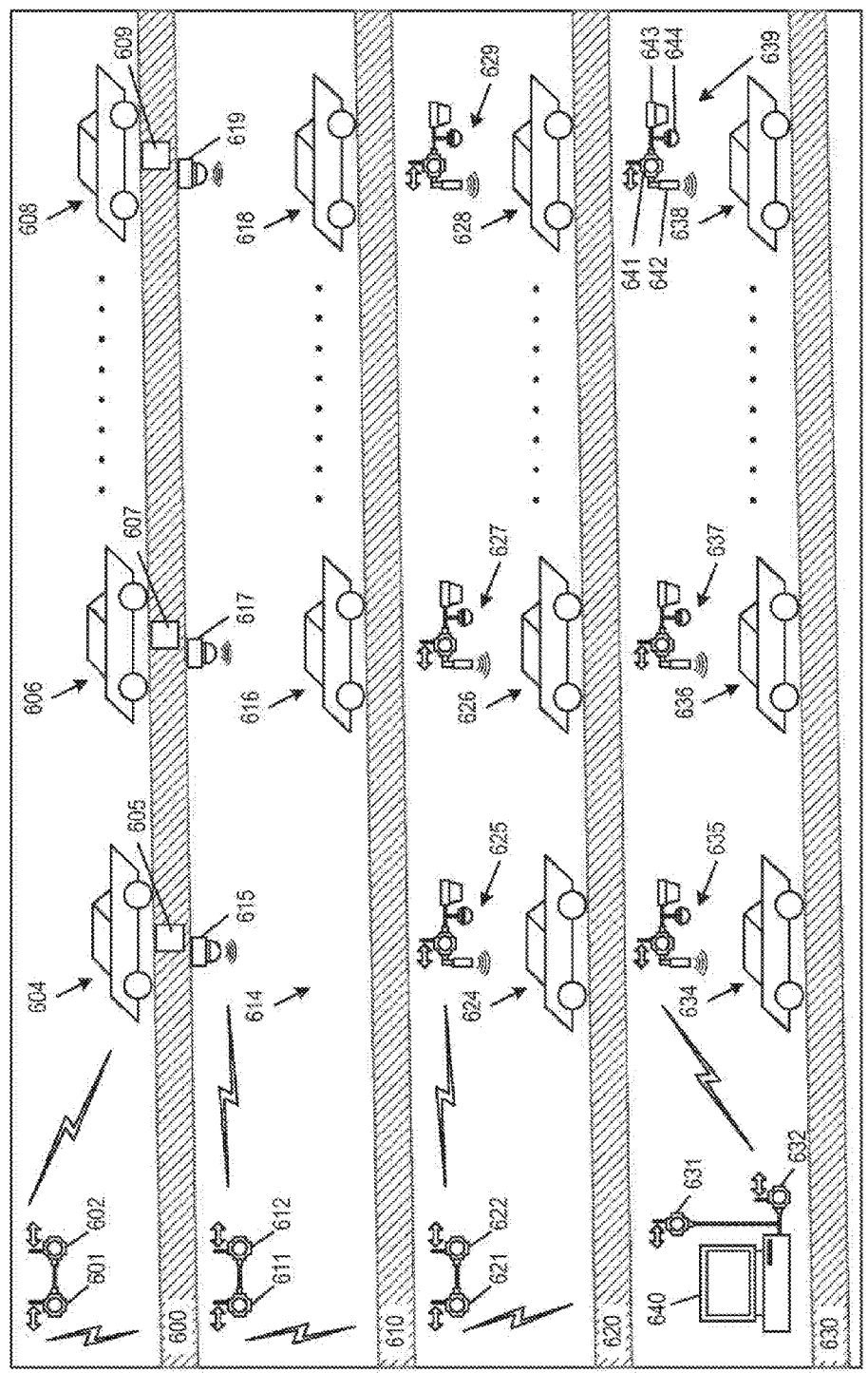
FIG. 25 is a pictorial view of a parking garage application which uses a network of indicator light devices.

FIG. 25 shows an illustrative system for wireless vehicle detection and indication to be used in single space parking and way finding applications. The solution utilizes a combination of wireless connectivity, ultrasonic sensors, magnetometers, and/or battery power to create a parking sensor system that is effective over a long service life, while being inexpensive, convenient and easy to install and maintain.

The system uses a hierarchical wireless sensor and indicator network installed throughout a parking garage. The individual components include wireless ultrasonic sensor and LED indicator nodes, wireless magnetometer nodes, wireless ultrasonic sensor nodes, wireless LED indicator nodes, battery packs, wireless gateway devices, and a host.

The parking garage illustrative has four ramps or levels 600, 610, 620 and 630. The top or fourth level ramp 600 is open to the sky and provides three parking spaces 604, 606 and 608, all of which are occupied by vehicles. Magnetometers 605, 607 and 609 located on the ramp 600 are used to detect vehicles parked over them, and are powered with integrated D-cell lithium batteries to achieve a long service life. Suitable magnetometers include the model M-Gage™ DX80 node available from Banner Engineering Corp. of Minneapolis, Minn., USA. While magnetometers 605, 607 and 609 are shown as cylindrical devices mounted into respective holes in the ramp 600, they may take the form of a half oblate spheroid that is surface-mounted, or any other desired form. Indicator lights are not used, but may be used if desired. If used, they may be pole-mounted, wall-mounted or floor-mounted, and may be operated at a high intensity to be readily visible to drivers. The magnetometers 605, 607 and 609 are provided with wireless communications capability and are wirelessly networked to wireless gateway 602, which is wired to a data radio 601 for communications to a host computer 640 via data radio 631.

The third level ramp 610 is covered by a ceiling and provides three parking spaces 614, 616 and 618, of which space 614 is vacant and spaces 616 and 618 are occupied by vehicles. Respective indicator-sensor devices 615, 617 and 619 are mounted on a ceiling over ramp 610 and are positioned over the parking spaces 614, 616 and 618. Each of the devices 615, 617 and 619 is a unitary device similar to the wirelessly networked indicator light device shown in FIG. 23, and contains an indicator light, an ultrasonic sensor, wireless communications and control circuitry, and a self-power source. In this example, it is presumed that sensing, indication and wireless communication may all be effectively performed from the same position over the parking spaces of the third level ramp 610. The self-power source may be D-cell lithium batteries to achieve a long service life, or may be four (4) D-cell alkaline batteries if the anticipated power consumption is low or if long service life is not needed. Alternatively, if line voltage is available, it may be used instead of the self-power source. The devices 615, 617 and 619 are wirelessly networked to wireless gateway 612, which is wired to a data radio 611 for communications to the host computer 640 via the data radio 631.

The second level ramp 620 is covered by a ceiling and provides three parking spaces 624, 626 and 628, all of which are occupied by vehicles. Respective indicator-sensor devices 625, 627 and 629 are mounted on a ceiling over ramp 620 and are positioned over the parking spaces 624, 626 and 628. Each of the devices 625, 627 and 629 is made of modules similar to the wirelessly networked indicator light device shown in FIG. 22, and contains an indicator light module (see module 644 of the device 639), an ultrasonic sensor module (see module 642 of the device 639), a wireless communications and control circuitry module (see module 641 of the device 639), and a self-power source module (see module 643 of the device 639). However, unlike the device shown in FIG. 22, only the ultrasonic sensor module and the wireless communications and control circuitry module are assembled into a unit, which is interconnected to the indicator light module and the self-power source module by suitable wiring. In this example, it is presumed that sensing and wireless communication may be effectively performed from the same position over the parking spaces of the second level ramp 620, but that indication and mounting of the power supply are preferably performed at different locations. The self-power source may be D-cell lithium batteries, D-cell alkaline batteries, or line voltage, as desired. The devices 625, 627 and 629 are wirelessly networked to wireless gateway 622, which is wired to a data radio 621 for communications to the host computer 640 via the data radio 631.

The first or ground level ramp 630 is covered by a ceiling and provides three parking spaces 634, 636 and 638, all of which are occupied by vehicles. Respective indicator-sensor devices 635, 637 and 639 are mounted on a ceiling over ramp 630 and are positioned over the parking spaces 634, 636 and 638. Each of the devices 635, 637 and 639 is made of modules, and is similar to each of the devices 625, 627 and 629. In this example, it is presumed that sensing and wireless communication may be effectively performed from the same position over the parking spaces of the first level ramp 630, but that indication and mounting of the power supply are preferably performed at different locations. The devices 635, 637 and 639 are wirelessly networked to wireless gateway 632, which is wired to the host computer 640.

The hierarchical network architecture used in the parking system of FIG. 25 is scalable. The sensor network is partitioned into multiple sub-nets, each of which may have any number of sensor nodes and one wireless gateway. The sensor nodes are addressed in any desired manner such as, for example, with rotary switches, and are bound to a particular gateway during operation.

The gateways are represented in the network as Modbus slaves. Each gateway is given a different Modbus slave address. The sensor node occupancy data for an entire sub-net is held in a bitwise representation using, for example, an efficient coding such as 7 bytes which contain the status of all nodes.

The host controller is configured as a Modbus Master device. Occupancy at the parking facility may be captured by periodically polling the bitwise occupancy registers in the respective gateways for the sub-nets. Configuration and diagnostic information may be obtained by polling individual holding registers.

Advantageously, the system is scalable. In the illustrative system described, a single host controller, or Modbus master, can oversee 247 different gateway sub-nets. Each sub-net can contain up to 56 sensor nodes. Therefore the total occupancy per master is 13,832 sensor nodes. These capacities are illustrative, since many other systems and capacities are available.

Suitable network components and wireless magnetometer nodes are available from Banner Engineering Corp. of Minneapolis, Minn., USA.

Application Example: Parking Facility with Dynamically Assigned Parking Spaces

Indicator light devices may be used in a system for dynamically assigning and reserving parking spaces for specific users, especially in facilities for which demand for parking spaces may exceed supply. An illustrative system of this type includes devices at points of ingress and egress for associating the vehicle or occupant with a unique code, such as, for example, a keypad for receiving a code pre-assigned to an occupant of the vehicle, a reader for reading an electronic room key or other type of key card, a bar code reader for reading a bar code applied to the vehicle or carried by an occupant, an NFC reader for reading a code from an NFC transmitter applied to the vehicle or presented by an occupant, a license plate reader, and so forth. In a hotel parking garage, for example, the reception clerk may provide the code to a guest during check-in.

The code is acquired by the system as the vehicle occupied by the guest approaches the facility. In the hotel example, a keypad may be provided at the entrance to the parking garage so that that guest may key in the code, or a key card reader may be provided to read the encoding on the guest's electronic room key, wherein the encoding may serve as the code. The system authenticates the code and allows the vehicle to enter the parking facility. As part of the authentication process, the reception clerk may during the check-in process set a guest status parameter associated with the code in the system as "unassigned" so that persons who have not checked in or who have checked out (the guest status may be cleared at check-out) may be denied access to the parking garage.

The system assigns a parking space to the vehicle. One technique is for the system to pre-assign the parking space. In the hotel example, the system may automatically select a parking space number, change the guest status parameter to the assigned parking space number, and flash the indicator light device associated with the assigned parking space a suggestive color, illustratively green. All other indicator light devices in the system may be left dark or flashed red. Another technique is to allow the driver to select any available parking space. The system may flash all available spaces a suggestive color such as green, while the unavailable spaces may be flashed another suggestive color such as red. When the driver parks the vehicle in one of the available parking spaces, the vehicle is detected and the system may change the guest status parameter to the assigned parking space number. In either case, the indicator lights may be turned off after the vehicle is detected in the parking space to manage power consumption. Another technique is for the reception clerk to manually instruct the system to assign a particular available parking space to the vehicle.

The vehicle may leave the parking facility without losing parking privileges. When a legally parked vehicle egresses the parking facility and attempts to re-enter, the system acquires and authenticates the code as the vehicle approaches the facility, and allows the vehicle to enter the parking facility. In one technique, the system flashes the indicator light device associated with the assigned parking space a suggestive color, illustratively green, based on the code. All other indicator light devices in the system may be left dark or flashed red. Another technique is for the system to change the guest status parameter to "unassigned" upon re-entry, and allow the driver to select any available parking space as described above. Note that the parking space remains assigned while the vehicle is away, thereby preserving parking privileges. In either case, the indicator lights may be turned off after the vehicle is detected in the assigned parking space.

The system may have various additional capabilities. A notable capability for facilities in which demand may exceed supply includes reporting facility capacity, and in particular a facility full alert so that alternative parking arrangements may be initiated when the parking facility is full.

The system may be provided with additional capabilities for detecting fraudulent or mistaken parking activity so that corrective action may be taken, either by the system or by a facility agent such as, in the hotel example, by the reception clerk, concierge, or parking attendant. One type of mistake is for an authenticated vehicle to park in a "wrong" parking space, such as a space that is not assigned to it. If the wrong parking space is assigned to another, the system may flash the indicator light device associated with the wrong parking space a suggestive color, illustratively yellow, and generate an "investigate" alert so that the problem may be promptly resolved by a facility agent. If the space is unassigned, the parking attempt may be treated as a space assigned to another, or may be treated as a new parking space assignment as described above.

Another type of mistaken parking activity is the slow parker. If the first-to-enter vehicle is confused or slow to park, a second vehicle may enter the parking facility before the first-to-enter vehicle has parked. If parking spaces are assigned to both vehicles and the system is configured for returning vehicles to park in previously assigned spaces, a problem may occur either when the first-to-enter vehicle parks in the parking space assigned to the second-to-enter vehicle, or when the second-to-enter vehicle parks in the parking space assigned to the first-to-enter vehicle. One technique for handling this problem is to automatically reassign the parking spaces. Another technique is to take no action. If one of the vehicles should leave and return, it may not be able to park in its previously assigned space and would then be treated as a parking in a wrong space. Another technique for handling this problem is to presume that the problem arises whenever a second vehicle enters before a first-to-enter vehicle has parked, in which case the system may flash the indicator light devices associated with both assigned parking spaces a suggestive color, illustratively yellow, and generating an "investigate" alert to a facility agent.

A common and serious problem with some parking facilities is the illegal vehicle that closely follows an authorized vehicle into the parking garage through the entrance gate. Should the system detect one or more additional parkings during the interval between two code acquisitions, the system may flash the indicator light devices associated with all of the parking spaces occupied during that interval a suggestive color, illustratively yellow, and generate an "investigate" alert to a facility agent.

Another common and serious problem with some parking facilities is the illegal vehicle that uses a code assigned to another. If the code submitted by an arriving vehicle is authenticated but the assigned space is occupied, the parked vehicle in the assigned space could be either a legal occupant or an illegal occupant. While the system may prohibit entry to the arriving vehicle, this may not be desirable since the arriving vehicle may be a legal occupant. Therefore, the system may allow the arriving vehicle to enter but indicate available spaces by flashing the associated indicator light devices a suggestive color, illustratively yellow. When the arriving vehicle is parked, the system may flash the indicator light devices associated with the spaces containing the arriving vehicle and the parked vehicle a suggestive color, illustratively yellow, and generate an "investigate" alert to a facility agent.

An "investigate" alert may be handled in any desired manner. Illustratively, the investigate alert may be provided to the facility agent, who upon receiving may inspect the vehicles parked in spots indicated by yellow lights, query the system for the room numbers of the guests associated with the parking spaces (or this information may be provided as part of the "investigate" alert), contact the guests to understand the situation, instruct the system to make any desirable reassignments, and take appropriate enforcement action against illegally parked vehicles.

The description of the various embodiments of the invention including its applications and advantages as set forth herein is illustrative and is not intended to limit the scope of the invention. Variations and modifications of the embodiments disclosed herein may be made, and practical alternatives to and equivalents of the various elements of the embodiments would be known to one of ordinary skill in the art upon a study of this patent document. Moreover, unless otherwise stated any values provided herein are approximations and are illustrative, as would be appreciated by one of ordinary skill in the art. These and other variations and modifications of the embodiments disclosed herein, including of the alternatives and equivalents of the various elements of the embodiments, may be made without departing from the scope and spirit of the invention as set forth in the accompanying claims.

The invention claimed is:

1. A system with energy management of visual capacity indicators for a facility, the system comprising:
    a controller;
    a plurality of indicator light devices (ILDs), wherein each ILD of the plurality of ILDs is connected via a network to the controller, each ILD of the plurality of ILDs is associated with a physical location and is configured to activate or deactivate a light source associated with each of the physical locations, and each ILD is coupled to at least one presence detector, wherein, for each of the ILDs in the plurality of ILDs, the corresponding at least one presence detector is configured to detect whether each of the physical locations associated with the ILD is occupied;
    a counting module operably coupled to the controller and configured to monitor an available supply of unoccupied physical locations in the plurality of physical locations;
    a non-transitory computer-readable medium operably coupled to the controller, wherein the computer-readable medium comprises a program of instructions that, when executed by the controller, cause the controller to perform operations to conserve power for the ILDs, the operations comprising:
    receive an available supply signal from the counting module, the available supply signal representing the available supply of unoccupied physical locations in the plurality of physical locations;
    determine, based on the received available supply signal, whether a percentage of all of the physical locations that are occupied meets a predetermined occupancy threshold;
    receive a presence signal from each of the presence detectors coupled to each of the ILDs in the plurality of ILDs, the received presence signals identifying which of the physical locations is occupied;
    if the percentage of all of the physical locations that are occupied meets the predetermined occupancy threshold, selectively activate, for each ILD of the plurality of ILDs, the light source associated with each of the physical locations that is not occupied; and,
    if the percentage of all of the physical locations that are occupied does not meet the predetermined occupancy threshold, deactivate all of the light sources of all the ILDs in the plurality of ILDs.

2. The system of claim 1, wherein the each of the physical locations comprises at least one parking space of a parking facility.

3. The system of claim 1, wherein each of the ILDs in the plurality of ILDs is operably coupled to at least one sound source indicator.

4. The system of claim 1, further comprising a clock module operably coupled to the controller and configured to determine, based on the received available supply signal, a slow time of the day during which the percentage of all of the physical locations that are occupied is not likely to meet the predetermined occupancy threshold, and to deactivate the at least one light source of each ILD of the plurality of ILDs during the determined slow time of the day.

5. The system of claim 1, wherein each ILD of the plurality of ILDs further comprises a network module in operable communication with the controller.

6. The system of claim 1, wherein the network comprises a wireless network.

7. The system of claim 1, wherein the operation to activate the light source of each ILD of the plurality of ILDs further comprises synchronously flashing at least one of the light sources that is associated with one of the physical locations that is not occupied.

8. The system of claim 1, wherein the operation to activate the light source of each ILD of the plurality of ILDs further comprises coordinating flash patterns for at least one light source that is associated with one of the physical locations that is not occupied.

9. The system of claim 1, wherein the operations further comprise to determine, based on the received presence signal, whether a percentage of all of the physical locations that are occupied meets a predetermined occupancy threshold.

10. The system of claim 1, further comprising a self-powered source coupled to each ILD of the plurality of ILDs.

11. The system of claim 1, wherein each of the presence detectors is selected from the group consisting of: a magnetometer, an ultrasonic sensor, and a camera.

12. A system with energy management of visual capacity indicators for a facility, the system comprising:
    a controller;
    a plurality of indicator light devices (ILDs), wherein each ILD of the plurality of ILDs is connected via a network to the controller, each ILD of the plurality of ILDs is associated with a physical location and is configured to activate or deactivate a light source associated with each of the physical locations, and each ILD is coupled to at least one presence detector, wherein, for each of the ILDs in the plurality of ILDs, the corresponding at least one presence detector is configured to detect whether each of the physical locations associated with the ILD is occupied;
    a non-transitory computer-readable medium operably coupled to the controller, wherein the computer-readable medium comprises a program of instructions that, when executed by the controller, cause the controller to perform operations to conserve power for the ILDs, the operations comprising:
    determine whether a percentage of all of the physical locations that are occupied meets a predetermined occupancy threshold;
    if the percentage of all of the physical locations that are occupied meets the predetermined occupancy threshold, selectively activate, for each ILD of the plurality of ILDs, the light source associated with each of the physical locations that is not occupied; and,
    if the percentage of all of the physical locations that are occupied does not meet the predetermined occupancy threshold, deactivate all of the light sources of all the ILDs in the plurality of ILDs.

13. The system of claim 12, wherein the each of the physical locations comprises at least one parking space of a parking facility.

14. The system of claim 12, wherein each ILD of the plurality of ILDs further comprises a network module in operable communication with the controller.

15. The system of claim 12, wherein the network comprises a wireless network.

16. The system of claim 12, wherein the operation to activate the light source of each ILD of the plurality of ILDs further comprises synchronously flashing at least one of the light sources that is associated with one of the physical locations that is not occupied.

17. The system of claim 12, wherein the operation to activate the light source of each ILD of the plurality of ILDs further comprises coordinating flash patterns for each of the light sources that is associated with one of the physical locations that is not occupied.

18. The system of claim 12, further comprising a self-powered source coupled to each ILD of the plurality of ILDs.

19. The system of claim 12, wherein the operations further comprise:
   receive a signal from each of the presence detectors coupled to each of the ILDs in the plurality of ILDs, the received signals identifying which of the physical locations is occupied.

20. The system of claim 19, wherein the operation to determine whether a percentage of all of the physical locations that are occupied meets a predetermined occupancy threshold is further based on the received signals.

21. A system with energy management of visual capacity indicators for a facility, the system comprising:
   a controller;
   a plurality of indicator light devices (ILDs), wherein each ILD of the plurality of ILDs is connected via a network to the controller, each ILD of the plurality of ILDs is associated with a physical location and is configured to activate or deactivate a light source associated with each of the physical locations, and each ILD is coupled to at least one presence detector, wherein, for each of the ILDs in the plurality of ILDs, the corresponding at least one presence detector is configured to detect whether each of the physical locations associated with the ILD is occupied;
   a clock module operably coupled to the controller and configured to monitor operable times of the day;
   a non-transitory computer-readable medium operably coupled to the controller, wherein the computer-readable medium comprises a program of instructions that, when executed by the controller, cause the controller to perform operations to conserve power for the ILDs, the operations comprising:
   determine an operable time of the day in accordance with a predetermined operating time,
      during the determined operable time of day:
         determine whether a percentage of all of the physical locations that are occupied meets a predetermined occupancy threshold;
            if the percentage of all of the physical locations that are occupied meets the predetermined occupancy threshold, selectively activate, for each ILD of the plurality of ILDs, the light source associated with each of the physical locations that is not occupied; and,
            if the percentage of all of the physical locations that are occupied does not meet the predetermined occupancy threshold, deactivate all of the light sources of all the ILDs in the plurality of ILDs; and,
      outside of the determined operable time of day:
         deactivate all of the light sources of each ILD of the plurality of ILDs until an operable time is determined.

* * * * *